Jan. 8, 1929.  
W. H. WHATMOUGH  
1,698,354  
APPARATUS FOR THE PRODUCTION OF DISPERSIONS OF SOLIDS IN LIQUIDS  
Filed Aug. 16, 1928
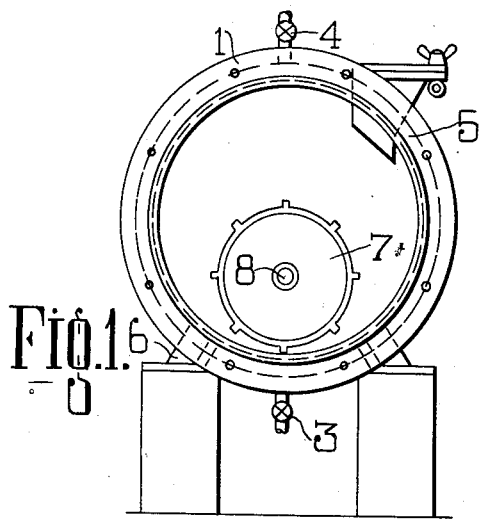
Fig.1.
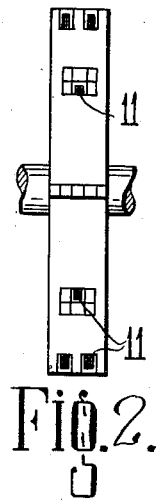
Fig.2.
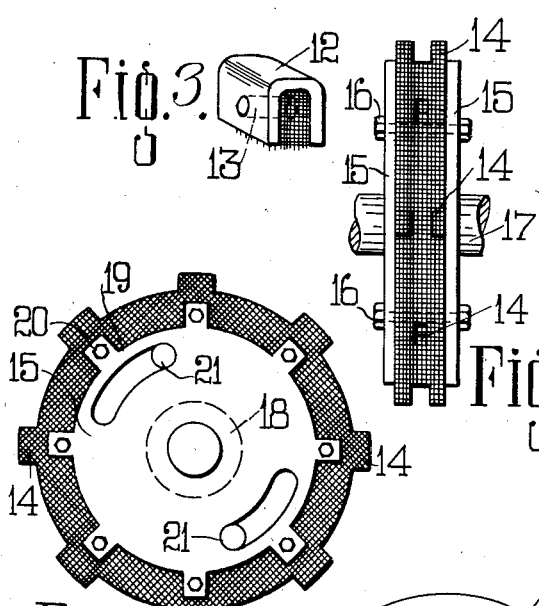
Fig.3. Fig.4. Fig.5.
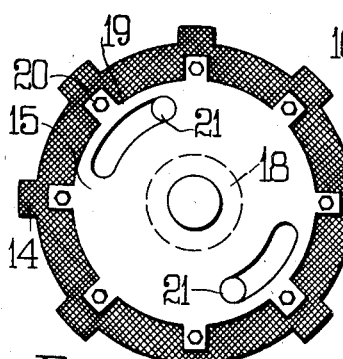
Fig.6.
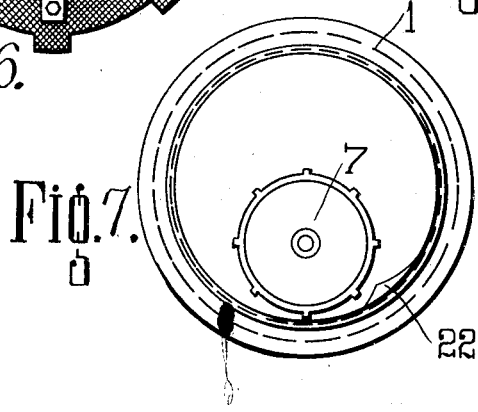
Fig.7.
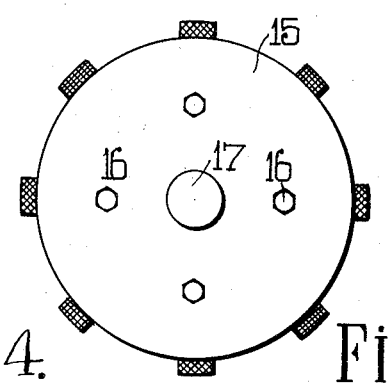
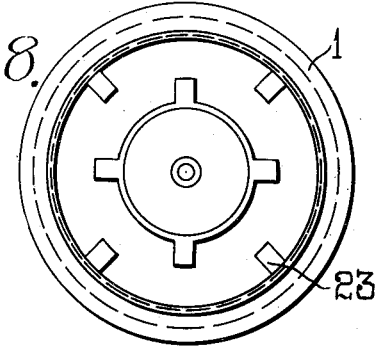
Fig.8.
INVENTOR  
William Henry Whatmough  
BY Newell + Spencer  
ATTORNEY Patented Jan. 8, 1929.

1,698,354

UNITED STATES PATENT OFFICE.

WILLIAM HENRY WHATMOUGH, OF LONDON, ENGLAND, ASSIGNOR TO STANDARD PRODUCTS CORPORATION, OF NEW YORK, N. Y.

APPARATUS FOR THE PRODUCTION OF DISPERSIONS OF SOLIDS IN LIQUIDS.

Application filed August 16, 1928, Serial No. 300,107, and in Great Britain April 29, 1927.

This invention relates to an improved apparatus for the dispersion of solids, especially amorphous aggregates in liquids. The invention is particularly suitable for the production of dispersions of colours in oil to produce highly concentrated or pasty masses suitable for printing inks and the like.

Attempts have been made to produce highly concentrated dispersions of pigments or colours in oil by the aid of high speed mills, for example mills having intercalating beaters rotating at high speed or having a conical disc rotating at high speed in close proximity to a smooth surface. Extensive investigations into the operation of such high speed apparatus has shown that it is not possible to reduce all the solid particles to such small size that they will remain dispersed indefinitely in the oil unless the grinding is prolonged for an excessive length of time. In my British patent specification No. 276,400 I have pointed out that the mixture after treatment appears to contain a large number of globules which appear to be somewhat elastic in their properties and are not further broken down in the high speed mill, except under very prolonged and expensive treatment.

It is an object of the present invention to produce dispersions of solids in liquids, which dispersions have a high concentration of solid material and which will retain the solids in suspension indefinitely.

A further object of the invention is to disperse colored materials in oils so as to produce a material which is suitable for use in printing inks and for other similar uses.

A further object of the invention is to improve the means employed in producing such dispersions.

It has now been found that it is possible rapidly to disperse amorphous aggregates in liquids by causing such aggregates while suspended in liquid to be impacted by a beater member of reticulated structure rotating at high speed. If the beater element is formed wholly or partly of wire gauze, such amorphous aggregates are subjected to a rubbing action which secures their effective dispersion in the liquid.

If such rubbing action is limited to the surface of the wire gauze, the fullest benefits will not be obtained except by repeatedly subjecting the liquid to be dispersed to the treatment. To secure a more effective result, it is desirable to allow the aggregates while suspended in liquid to impinge at high speed upon a beater member having interstices through which the particles can pass in rubbing contact with the integral surface thereof.

It will be seen that the apparatus of this invention does not effect the dispersion of pigments by reason of any shearing action between relatively moving surfaces, but effects this result largely by reason of the impact of a solid body upon the solid particles while suspended in the liquid and further by the rubbing action produced by the filamentous structure of the reticulated body employed.

I have found wire gauze having 30 strands to the linear inch to be very effective in treating mineral blue. The size of mesh which is most effective seems to depend upon the concentration of solid in the mixture and on the friability of the solid e. g. kaolin can be treated with gauze having 20 strands to the linear inch. In most cases it will be desirable to use a combination of two or more gauzes of different mesh. Thus the gas black which is sold under the name "Peerless Black" has up to the present given the best results with a beater formed of alternate layers of 30 mesh and 60 mesh gauze. The invention is not however limited to the use of wire gauze because other solid reticulated or filamentous structures formed for example of metallic shavings, wire or turnings may usefully be employed.

In apparatus constructed in accordance with the present invention amorphous aggregates while suspended in liquid are impacted by a beater element of reticulated structure rotating at high speed in a liquid-tight casing. The beater element may be formed of superimposed layers of metallic wire mesh.

The invention also includes suitable apparatus comprising a liquid-tight casing and a rotor mounted therein adapted to be rotated at high speed provided with one or more beater elements of reticulated structure therein. Thus the rotor may have one or more beater elements composed of superimposed layers of metallic wire mesh. Such a beater element for impact upon friable solid particles suspended in a liquid is believed to be novel in this art. Preferably baffles are employed to direct the liquid and suspended solid into the path of the beaters or to the inside of the reticulated structure. The baffles themselves may be of reticulated structure.

Another feature of the invention which is described and claimed in the applicant's co-pending application, Serial No. 310,232, filed October 4, 1928 consists in employing a rapidly rotating member carrying a large number of small projections. Thus there may project from the beater a large number of fine pointed projections such as the ends of wires. These projections moving at high speed through the liquid appear to exert a peculiar disruptive action upon the aggregates of fine particles which are thereby broken down to form substantially stable suspensions of the solid in liquid.

In constructing apparatus suitable for this form of the invention a few strands are removed from the edges of the wire gauze employed as the beater element.

Such a piece of gauze may be rotated edgewise in the liquid, but it is preferred to employ a plurality of such pieces of gauze so as to form a laminated body provided on its periphery with a large number of pointed projections. These projections may be cut to point or knife edge as desired.

Various forms of apparatus embodying the present invention are shown in the accompanying drawings in which:—

Figure 1 is an elevation of a general arrangement of casing and rotor.

Figure 2 is a side elevation of a rotor with a filamentous filling between the beater bars.

Figure 3 is a perspective view of a filamentous filling unit as applied in Figure 2.

Figure 4 is an end elevation of a rotor built up of superimposed layers of wire mesh.

Figure 5 is a front elevation of the rotor shown in Figure 4.

Figure 6 is a front elevation of a modified construction of the rotor shown in Figures 4 and 5.

Figure 7 is a front elevation of a general form of mill showing one form of baffle and Figure 8 is a plan view of a horizontal mill.

Referring to the drawings, 1 is the casing of the mill which may have a jacket 2 provided with inlet 3 and outlet 4 for cooling liquid. 4 may be used as inlet and 3 as outlet for heating liquid if desired or necessary.

Material to be dispersed can be fed in at 5 and removed at 6.

The mixture of solid and liquid is dispersed by the action of the rotor 7 mounted to rotate at 8.

In Figure 2 the spaces between these beater bars 10 are filled up by reticulated units of wire mesh 11 shown in detail in Figure 3. A plurality of sheets of wire mesh are placed face to face and enclosed within a channel 12 of sheet metal or other material. The sheets of gauze are kept in position and secured between the beater bars by a bolt (not shown) passing through the hole 13. In Figure 2 the reticulated units are shown with the bottom of the channel outwards but they may equally be placed with the bottom of the channel inwards. A large number of free ends of the wire may project from the beaters as shown in Figure 3. The latter modification of the invention in which the beater elements are provided with projecting wires or points is covered by my co-pending application referred to above.

A modified form of rotor is shown in Figures 4 and 5 in which the rotor is built up of a plurality of sheets of wire gauze cut to a circular form with projecting lugs 14 which act as beater bars. These sheets are secured between plates 15 by bolts 16 on to a spindle 17. As shown each sheet has four lugs but the sheets are placed in staggered relationship so that twelve beater bars are formed in eight alternate rows of two and one. More than eight lugs (e. g. sixteen) may be cut in each sheet if desired and the sheets may be associated in different manners e. g. to form four or eight beater bars extending right across the periphery of the rotor. As shown in Figures 4 and 5 the plates 15 extend to the periphery of the rotor but smaller plates may be used if desired.

In Figure 6 the side walls 15 extend from a centre boss 18 to an annular wall 19 which is provided with a large number of perforations. An annular member 20 formed of superimposed layers of wire gauze and having if desired lugs forming beater bars 14 is then secured to the outside of this annular wall 19.

On the walls 15 are mounted cowls 21 which pick up liquid and divert it into the chamber formed between the boss 18 and wall 19. Thence it passes through the perforations in the wall 19 and through the wire mesh 20. If desired the wire mesh 20 instead of being built up of annular plates of gauze placed face to face may be formed without lugs by wrapping a number of convolutions of a strip of gauze round the wall 19.

Figure 7 shows an arrangement similar to Figure 1 in which a baffle 22 is provided to guide the liquid into the path of the beater.

Figure 8 shows a form of mill suitable for use in a horizontal position. In this the rotor 7 is mounted concentrically in the casing and baffles are mounted at different points on the wall. Any of the forms of rotor shown in Figures 2, 4, 5 or 6 may be employed and in general the rotor and/or the baffles may be reticulated structure.

The forms of construction shown above are illustrative only of general ways of constructing apparatus suitable for the present invention which is not limited to these forms given merely by way of example.

In testing the efficiency of various forms of apparatus operating according to the present invention I have employed a mixture consisting of 4 pounds of mineral oil, 3 ounces of carnauba wax and 8 ounces of colour comprising an ordinary mineral blue. Known forms of beater mills having solid beater bars can be operated to produce a mixture containing approximately 80% of solid sufficiently finely dispersed to remain in suspension when kept at a temperature of 120° C. for 8 hours, but it was found as the result of extensive investigation that no simple alteration in the method of operating such apparatus and no alteration in the physical variables such as temperature, except time of grinding, had any substantial effect in improving the efficiency beyond this limit of 80%. This figure is arbitrary in that it represents the quantity of solid remaining in suspension over a period of 8 hours at 120° C. If the mixture is allowed to cool the coarser particles settle more slowly or not at all and the proportion remaining in suspension will be correspondingly greater, and conversely if the temperature is raised or the mixture diluted with a thinner medium such as paraffin oil, a large proportion of particles of colour will settle out in the test period of 8 hours.

In utilizing apparatus embodying the present invention definite and substantial improvement beyond this 80% was effected and it was found possible to employ a higher ratio of colour and wax to oil and still obtain satisfactory dispersion of the colour in the oil.

Employing the apparatus shown in the drawings, liquid containing amorphous aggregates is introduced into the space between the wall of the casing and the rotor. By operating with speeds of 3,000 revolutions per minute, equivalent to a speed of approximately 2,000 metres per minute, successful results were obtained in dispersing such highly concentrated pastes as 3 pints of oil, 1 pound of wax and 4 pounds of mineral blue. By subjecting this mixture to high speed treatment in the mill described above for 5 to 10 minutes at an initial temperature of 100° C. 95% of the solid was dispersed to a sufficient degree of fineness to remain in suspension under the test conditions referred to above. During the 5–10 minutes of treatment the temperature may rise to about 120°. Higher speeds than that given above may be employed and it is believed also that lower speeds can be employed with successful results.

I declare that what I claim is:

1. Apparatus for dispersing amorphous aggregates in liquid comprising a liquid-tight casing and a beater mounted therein formed of superimposed layers of wire gauze, and adapted to be rotated at high speed.

2. A beater element for impact at high speed upon friable solid particles suspended in liquid consisting of a body of superimposed layers of metallic wire mesh.

3. Apparatus for dispersing amorphous aggregates in liquids comprising a liquid-tight casing, a beater element mounted therein of reticulated structure and adapted to be rotated at high speed and means rotatable with said beater element for causing the material being treated to pass through the reticulated structure.

4. Apparatus for dispersing amorphous aggregates in liquids comprising a liquid-tight casing, a rotor mounted therein and adapted to be rotated at high speed, said rotor being formed of superimposed layers of wire gauze and plates for securing said gauze in position, said plates being provided with cowls to direct the material to be treated into said rotor and through said wire gauze.

5. Apparatus for dispersing amorphous aggregates in liquids comprising a casing, a rotor mounted therein and adapted to be rotated at high speed, said rotor being provided on its periphery with reticulated beater elements positioned in staggered relation with reference to each other.

6. Apparatus for dispersing amorphous aggregates in liquids comprising a casing, a rotor mounted therein and adapted to be rotated at high speed, said rotor being provided with circumferentially extended reticulated beater elements upon its periphery through which the material may pass circumferentially.

7. Apparatus for dispersing amorphous aggregates in liquids comprising a casing, a rotor mounted therein and adapted to be rotated at high speed, and beater elements carried by said rotor, said beater elements being formed of a plurality of layers of reticulated material, and means for holding said reticulated members in fixed position on said rotor.

In witness whereof, I have hereunto signed my name this 27th day of July 1928.

WILLIAM HENRY WHATMOUGH.